United States Patent [19]

Burger et al.

[11] Patent Number: 5,630,474
[45] Date of Patent: May 20, 1997

[54] PROCESS FOR THE EXTRACTION OF CRUDE OIL

[75] Inventors: Willibald Burger; Peter Huber, both of Burghausen, Germany; Piotr Meschkov, Moskau, Russian Federation; Serguei V. Goussevt, Tjumen, Russian Federation; Vladimir V. Mazajev, Tjumen, Russian Federation; Jaroslav G. Koval, Tjumen, Russian Federation

[73] Assignee: Wacker-Chemie GmbH, Munich, Germany

[21] Appl. No.: 533,239

[22] Filed: Sep. 25, 1995

[30] Foreign Application Priority Data

Sep. 29, 1994 [DE] Germany .................. 44 34 880.0

[51] Int. Cl.$^6$ .................................. E21B 43/22
[52] U.S. Cl. .................. 166/275; 166/305.1; 507/233; 507/234
[58] Field of Search .................. 166/273, 274, 166/275, 305.1; 507/233, 234

[56] References Cited

U.S. PATENT DOCUMENTS

| | | | |
|---|---|---|---|
| 3,634,305 | 1/1972 | Johnson et al. | 166/273 X |
| 3,700,031 | 10/1972 | Germer, Jr. et al. | 166/273 X |
| 4,146,499 | 3/1979 | Rosano | 166/274 X |
| 4,197,912 | 4/1980 | Barnhouse | 166/305.1 |
| 4,230,182 | 10/1980 | Bousaid | 166/273 |
| 4,296,812 | 10/1981 | Kalfoglou | 166/274 |
| 4,381,241 | 4/1983 | Romenesko et al. | 507/234 X |
| 4,472,291 | 9/1984 | Rosano | 166/274 X |
| 4,603,738 | 8/1986 | Oberkirch et al. | 166/275 |
| 4,828,029 | 5/1989 | Irani | 166/274 X |

FOREIGN PATENT DOCUMENTS

| | | |
|---|---|---|
| 2093505 | 10/1993 | Canada . |
| 0150718 | 8/1985 | European Pat. Off. . |
| 2057056 | 5/1972 | Germany . |

OTHER PUBLICATIONS

English Derwent abstract AN 93–098785.
English Derwent abstract AN 92–290721.

*Primary Examiner*—George A. Suchfield
*Attorney, Agent, or Firm*—Martin Connaughton

[57] ABSTRACT

In the process of the present invention, crude oil is extracted from crude oil-containing deposits with the aid of an emulsion containing the components
(A) 100 parts by weight of organopolysiloxane
(B) 10 to 100 parts by weight of surfactant and
(C) water.

5 Claims, No Drawings

5,630,474

PROCESS FOR THE EXTRACTION OF CRUDE OIL

FIELD OF INVENTION

The present invention relates to a process for the extraction of crude oil from crude oil-containing deposits using an organopolysiloxane emulsion.

BACKGROUND OF INVENTION

In most crude oil-containing deposits, the crude oil is forced out of the bore holes because of the pressure prevailing in the deposit. If the natural pressure is not sufficient for recovery of the oil, auxiliaries, such as water water/surfactant mixtures or gases, are pumped into the deposit in order to increase the pressure and/or to displace the crude oil from the oil-bearing layers.

U.S. Pat. No. 4,197,912 discloses a process for the extraction of crude oil from crude oil-containing deposits, in which organosiloxanes are dissolved or dispersed in hydrocarbons and this solution or dispersion is pumped into a bore hole to increase the yield. The handling of large amounts of hydrocarbons at the bore hole is hazardous owing to the low flash points and vapor pressures of the suitable hydrocarbons. In extensive deposits and low crude oil content of the deposits, the required amounts of hydrocarbon is not economical.

Processes have been described for the extraction of crude oil from crude oil-containing deposits in which an aqueous surfactant solution is injected into an injection well with the aim of forming a surfactant solution front in the deposit, which front pushes the crude oil in the direction of a production well. The mixture of water, surfactant and crude oil formed is extracted through a production well. Such a process is described in U.S. Pat. No. 4,296,812. The aqueous surfactant solution contains silicon dioxide/dialkylsiloxane in a concentration which is considerably lower than the concentration of the surfactants. A similar process is disclosed by U.S. Pat. No. 4,230,182, in which a surfactant-containing fluid is injected which comprises an aqueous surfactant-containing phase and a discontinuous hydrocarbon phase which contains up to 15% by weight of an off-soluble silicone compound.

However, in the above processes, the crude oil displacement efficiency is unsatisfactory. The crude oil displacement efficiency is based on the proportion of the crude oil displaced and extracted from the formation in comparison to the total amount of crude oil contained in the formation. In practice the crude off containing deposits comprise layers having different permeabilities for the aqueous surfactant solution, therefore, a surfactant solution front does not form. Instead, the surfactant solution flows rapidly to the production well through the more permeable layers leaving the crude oil in those layers that are less permeable to the surfactant. The crude oil content of the mixture of water, surfactant and crude oil extracted is frequently so low that further processing is no longer economical.

SUMMARY OF INVENTION

The present invention relates to a process for the extraction of crude off from crude oil-containing deposits, in which an emulsion containing the components
(A) 100 parts by weight of organopolysiloxane,
(B) 10 to 100 parts by weight of surfactant and
(C) water
is used.

The object was to provide a process for the extraction of crude oil from crude oil-containing deposits which has a high crude oil displacement efficiency and a high crude oil content of the mixture extracted.

In the present invention, surfactants (B) are used only in an amount sufficient to hold organopolysiloxane (A) and, optionally, additives (D) in emulsion.

The organopolysiloxane (A) has a low surface tension, good diffusability in the rock of the crude oil-containing deposits, good wettability of the crude off-containing formation and chemical inactivity with respect to the formations present in the deposits, the crude oil and the materials used in extraction. The organopolysiloxane (A) also exerts a positive influence on crude off treatment processes, for example a foam-inhibiting action. In particular, the organopolysiloxane (A) is heat-stable at temperatures of 70° C. and considerably higher frequently prevailing in deposits as in the crude oil fields of Western Siberia.

The organopolysiloxane (A) is preferably made up of units of the formulae

 (I)

 (II)

 (III)

 (IV)

 (V)

 (VI)

 (VII)

in which

R represents monovalent hydrocarbon radicals having 1 to 18 carbon atoms, the hydrocarbon radicals being unsubstituted or substituted by halogen atoms, cyano, amino, alkylamino, quaternary ammonium, mercapto, epoxy, anhydrido, carboxylato, sulfonato, sulfato, phosphonato, isocyanato or polyoxyalkylene groups, R' represents monovalent hydrocarbon radicals having 1 to 30 carbon atoms and hydrogen atoms, the hydrocarbon radicals being unsubstituted or substituted by halogen atoms, cyano, amino, alkylamino, quaternary ammonium, mercapto, epoxy, anhydrido, carboxylato, sulfonato, sulfato, phosphonato, isocyanato or polyoxyalkylene groups.

Examples of hydrocarbon radical R and R' are alkyl radicals, such as methyl, ethyl, n-propyl, iso-propyl, n-butyl, iso-butyl, tert-butyl, n-pentyl, iso-pentyl, neo-pentyl and tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl, allyl and 5-hexen-1-yl radicals, cycloalkyl radicals, such as cyclopentyl, cyclohexyl and cycloheptyl radicals and methylcyclohexyl radicals; aryl radicals such as the phenyl, naphthyl, anthryl and phenanthryl radicals; alkaryl radicals, such as o-, m-, p-tolyl radicals, xylyl radicals and ethylphenyl radicals; aralkyl radicals, such as the benzyl radical, the α, β-phenylethyl radical.

Examples of substituted radicals R and $R^1$ are cyanoalky radicals, such as the β-cyanoethyl radical, and hydrocarbon radicals halogenated by fluorine, chlorine or bromine atoms, for example haloalkyl radicals, such as the 3,3,3-trifluoro-n-propyl radical, the 2,2,2,2',2',2'-hexafluoroisopropyl radical, the heptafluoroisopropyl radical, and haloaryl radicals, such as the o-, m- and p-chlorophenyl radicals.

Preferably, at least 90 mole % of the radicals R are methyl, ethyl or phenyl radicals, in particular methyl radicals.

Examples of the radicals R and $R^1$ substituted by polyoxyalkylene groups are the radicals of the formula $$R^1—[O(CR_2^2)_c]_dOR^2 \qquad (VIII),$$

in which $R^1$ represents a divalent $C_1$ to $C_6$-alkylene radical, $R^2$ represents hydrogen atoms or monovalent $C_1$ to $C_6$-hydrocarbon radicals, c represents the values 0, 1, 2, 3, 4 or 5, preferably 2 or 3 and d represents integers from 1 to 100, preferably 1 to 10.

Examples of the divalent radicals $R_1$ are saturated straight-chain or branched chain or cyclic alkylene radicals such as the methylene and ethylene radical and propylene, butylene, pentylene, hexylene, 2-methylpropylene and cyclohexylene radicals, or unsaturated alkylene radicals such as the propenylene and hexenylene radicals.

Examples of the monovalent radicals $R_2$ are listed under the above examples of R and R'.

Further examples of the radicals R and R' substituted by polyoxyalkylene groups are the radicals of the formula $$\begin{array}{c} C—[O(CR_2^2)_c]_dOR^2 \\ \| \\ HC—[O(CR_2^2)_c]_dOR^2 \end{array} \qquad (IX)$$

in which $R^2$, c and d have the meanings specified above for formula (VIII).

Preferably, at most 5 mole % of the units of the organopolysiloxane (A) have the formulae (V) to (VII).

Preferably, the organopolysiloxane (A) contains at least 50% by weight, in parti-cular at least 80% by weight, of organopolysiloxanes (A1) which comprise at least 90 mole %, in particular 95 mole %, of units of the formula (II), at least 50 mole % of the remaining units preferably having the formulae (I) and (V). It is preferred that organopolysiloxane (A1) has a mean viscosity of 50 to 500,000 mPa-s, in particular 350 to 60,000 mPa-s at 25° C.

Preferably, the organopolysiloxane (A) contains at least 0.5% by weight, in particular at least 1% by weight, and preferably at most 20% by weight of organopolysiloxane resins (A2) which comprise at least 90 mole %, in particular 95 mole %, of units of formulae (I), (IV) and (V). For example, the organopolysiloxane resins (A2) can be solid at room temperature and 15 can have 0.25 to 1.25 units of formula (I) per unit of formula (IV).

The preferred organopolysiloxane resins (A2) can contain, resulting from their preparation, up to a total of 5% by weight of Si-bound alkoxy radicals or hydroxyl groups. The organopolysiloxane resins (A2) are generally not completely miscible with polydimethylsiloxanes.

Although not stated in formulae (I) to (III), some of the radicals R can be replaced by hydrogen atoms bound directly to silicon atoms. This is not preferred, however.

Preferably, the surfactant (B) is selected from the surfactants below:

1. Alkyl sulfates, having a chain length of 8 to 18 C atoms, alkyl ether sulfates having 8 to 18 C atoms in the hydrophobic radical and 1 to 40 ethylene oxide (EO) or propylene oxide (PO) units.
2. Sulfonates, e.g., alkylsulfonates having 8 to 18 C atoms, alkylarylsulfonates having 8 to 18 C atoms, esters and half esters of sulfosuccinic acid with monohydric alcohols or alkylphenols having 4 to 15 C atoms; these alcohols or alkylphenols can optionally also be ethoxylated with 1 to 40 EO units.
3. Alkali metal salts and ammonium salts of carboxylic acids and poly(alkylene glycol) ether-carboxylic acids having 8 to 20 C atoms in the alkyl, aryl, alkaryl or aralkyl radical and 1 to 40 EO or PO units.
4. Partial esters of phosphoric acid and their alkali metal salts and ammonium salts, e.g., alkyl phosphates and alkaryl phosphates having 8 to 20 C atoms in the organic radical, alkyl ether phosphates or alkaryl ether phosphates having 8 to 20 C atoms in the alkyl radical or alkaryl radical and 1 to 40 EO units.
5. Alkyl polyglycol ethers, preferably those having 2 to 40 EO units and alkyl radicals of 4 to 20 C atoms.
6. Alkylaryl polyglycol ethers having 2 to 40 EO units and 8 to 20 C atoms in the alkyl and aryl radicals.
7. Ethylene oxide/propylene oxide (EO/PO)-block copolymers having 8 to 40 EO or PO units.
8. Fatty acid polyglycol esters having 6 to 24 C atoms and 2 to 40 EO units.
9. Alkyl polyglycosides of the formula $R''$—O—$Z_o$, in which $R''$ represents a linear or branched, saturated or unsaturated alkyl radical having on average 8 to 24 C atoms and $Z_o$ represents an oligoglycoside radical having on average o=1 to 10 hexose or pentose units or mixtures thereof.
10. Polar group-containing linear organopolysiloxanes having alkoxy groups and up to 24 C atoms and/or up to 40 EO and/or PO groups.
11. Salts of primary, secondary and tertiary fatty amines having 8 to 24 C atoms with acetic acid, sulfuric acid, hydrochloric acid and phosphoric acids.
12. Quarternary methylalkylammonium and methylalkylbenzylammonium salts whose alkyl groups have 6 to 24 C atoms, in particular the halides, sulfates, phosphates, acetates and hydroxides.
13. Alkylpyridinium, alkylimidazolinium and alkyloxazolinium salts whose alkyl chain has up to 18 C atoms, especially in the form of their halides, sulfates, phosphates and acetates.

One surfactant and also mixtures of a plurality of surfactants can be used.

More preferred surfactants are those listed above under 1, 2, 5, 6, 7 and 8, in particular the surfactants listed under 1, 2, 6 and 7.

Preferably, 30 to 80 parts by weight of surfactant (B) are used per 100 parts by weight of organopolysiloxane (A).

As additives (D), the emulsion can contain for example fillers, fungicides, bactericides, algicides, biocides, odor compounds, corrosion inhibitors and organic solvents.

Examples of fillers are hydrophilic and hydrophobic oxides of silicon, magnesium or zinc, having a surface area of at least 50 m²/g, salts of elements of groups II or III of the Periodic Table of the Elements according to Mendeleev having an atomic number of 12 to 30 with aliphatic monobasic carboxylic acids or hydroxycarboxylic acids having 12 to 22 carbon atoms per molecule, such as calcium stearate or calcium 12-hydroxystearate. Further examples of fillers in the emulsions are lithium stearate, magnesium silicate and magnesium aluminum silicate. Pyrogenically generated or precipitated, in particular hydrophobized, silicon dioxide having a surface area of at least 50 m²/g (highly disperse silicic acid) is more preferred.

The emulsions can contain one type of filler or mixtures of two or more different types of fillers. The content of filler is preferably up to 20 parts by weight, in particular 2 to 8 parts by weight per 100 parts by weight of organopolysiloxane (A).

The emulsions can contain small amounts of organic solvents as a result of their preparation. In particular in the preparation of organopolysiloxane resins, organic solvents are frequently used. If the emulsion contains organic solvents, their content is preferably at most 15 parts by weight, in particular at most 1 part by weight, based on 100 parts by weight of organopolysiloxane (A).

The content of filler is preferably up to 20 parts by weight, in particular 2 to 8 parts by weight per 100 parts by weight of organopolysiloxane (A).

The emulsions can be prepared by mixing their components in any desired sequence.

The total of the components organopolysiloxane (A), surfactants (B) and optionally additives (D), in the emulsion is preferably 0.01% to 2% by weight, in particular 0.05% to 1% by weight, based on the weight of the emulsion used.

In the examples below, unless stated otherwise,
(a) all amounts are by weight;
(b) all pressures are 0.10 Mpa (absolute);
(c) all temperatures are 20° C.

EXAMPLES

Example 1—Experimental procedure

The process according to the invention is described by a layer model of two ground cores having different permeability from a crude oil-bearing rock layer of a crude oil field at Tyumen in Western Siberia.

The permeability is defined as the filtration time of a defined gas volume through the core sample under test for a defined pressure gradient.

Two columns of equal length and equal diameter are filled with the ground material of the cores having different composition. The permeability, based on gas (absolute permeability) is then determined for each column. The liquids are added via an inlet tube which branches to the two columns. The ends of the two columns are combined in one outlet tube. Both columns are provided at both ends with devices for measuring the flow rate. The model is thermostated to a temperature of 55° C. The experiments are carded out at a pressure of 10 Mpa.

The columns are first saturated with water then saturated with crude oil from the above mentioned crude oil field at Tyumen. For this purpose, about twice the amount of the pore volume of the layer model is required. The columns are again flushed with water. When virtually pure water flows from the outlet tube, the ratio of the flow rates in the columns is determined. The closer the ratio is to 1, the higher is the crude oil yield.

The proportion of the crude oil displaced from the rock materials is measured and compared with the amount of crude oil initially required to saturate the columns. The crude oil displacement efficiency indicates the proportion of crude oil displaced from the rock in comparison to the total crude oil contained in the rock. The amount of crude oil required to saturate the rock is taken to be 100%.

20% of the pore volume of active compound solution is flushed through the column and subsequently water is flushed through until virtually pure water flows out.

The ratio of the flow rates in the columns is determined again.

The proportion of crude oil additionally displaced from the rock materials is measured, calculated as increase in crude oil displacement efficiency and added to the above mentioned crude oil displacement efficiency.

For a further experiment with a different active compound, the columns are packed with fresh rock material. Composition of the active compound solutions:

Active compound solution (a) –2.5% strength aqueous dilution of "Extract 700", a silicone emulsion from Wacker-Chemie GmbH, Munich.

"Extract 700" silicone emulsion comprises:
9.5% of an organopolysiloxane of the components polydimethyl siloxane of viscosity 350 mPa-s resin comprising $Me_3SiO_{1/2}$ and $SiO_{4/2}$ units αω-alkoxy functional silicone oil
7% of nonionic surfactants (NOAS) of the following composition:
4% of a mixture of esters of a polyhydric alcohol with a fatty acid and 3% of ethoxylated fatty alcohols
0.5% of highly disperse silicic acid and
83% of water.

A ratio of organopolysiloxane to NOAS of 9.5:7=1.36 is thus achieved.

Active compound solution (b) comprises: –1.25% of "Extract 700" silicone emulsion as described above and 0.30% of "WOF P-100", an ethoxylated alkylphenol from Buna.

An organosiloxane/NOAS ratio of 0.31 is thus calculated.

Active compound solution (c) comprises: –0.25% of "Extract 700" silicone emulsion as described above and 0.40% of "WOF P-100" ethoxylated alkylphenol. An organosiloxane/NOAS ratio of 0.06 is thus calculated.

The results are listed in Table I below:

TABLE 1

| Experiment | Before saturation with crude oil — Ratio of the permeabilities of the rock samples | Before injection of the active compound solution — Ratio of the flow rates | Before injection of the active compound solution — Crude oil displacement efficiency % | Before injection of the active compound solution — Ratio of siloxane/NOAS in the active compound solutions | After injection of the active compound solution — Ratio of the flow rate | After injection of the active compound solution — Crude oil displacement efficiency, % | After injection of the active compound solution — Increase in the displacement efficiency, % |
|---|---|---|---|---|---|---|---|
| a | 2.93 | 3.68 | 51.6 | 1.36 | 1.50 | 80.4 | 28.8 |
| b | 3.06 | 4.25 | 54.9 | 0.31 | 2.91 | 69.0 | 14.1 |
| c | 2.90 | 3.50 | 53.7 | 0.06 | 3.09 | 63.4 | 9.7 |

Example 2—Crude oil extraction

In a practical trial on the Yuzhno-Balykskoye crude oil deposit at Nefteyugansk, the Wacker product Extract 700 was pumped into the crude oil-bearing layer $AS_{5-6}$ via a total of four injection wells. The oil was extracted via twenty production wells.

For the trial 13.5 ton of a 1:40 dilution of "Extract 700" silicone emulsion were pumped into the four pressure wells in the course of 4 days. The total mount of "Extract 700" silicone emulsion dilution was thus 540 m$^3$. Water then continued to be introduced into the pressure wells. The additional extraction in the course of 8 months was 13,400 ton of crude oil, i.e., up to now 1,140 ton of crude oil/ton of "Extract 700" silicone emulsion could be additionally extracted.

What is claimed is:

1. A process for the extraction of crude oil from crude oil-containing deposits wherein an emulsion consisting of
   (A) an organopolysiloxane made up of units of the formulae $R_3SiO_{1/2}$, (I)

$R_2SiO$, (II)

$RSiO_{3/2}$, (III)

$SiO_{4/2}$, (IV)

$R_2(R'O)SiO_{1/2}$, (V)

$R(R'O)SiO$ (VI)

$R'OSiO_{3/2}$ (VII)

in which
   R represents monovalent hydrocarbon radicals having 1 to 18 carbon atoms, the hydrocarbon radicals being unsubstituted or substituted by halogen atoms, cyano, amino, alkylamino, quaternary ammonium, mercapto, epoxy, anhydrido, carboxylato, sulfonato, sulfato, phosphonato, isocyanato or polyoxy alkylene groups,
   R' represents monovalent hydrocarbon radicals having 1 to 30 carbon atoms and hydrogen atoms, the hydrocarbon radicals being unsubstituted or substituted by halogen atoms, cyano, amino, alkylamino, quaternary ammonium, mercapto, epoxy, anhydrido, carboxylato, sulfonato, sulfato, phosphonato, iso cyanato or polyoxyalkylene groups,
   (B) from 10 to 100 parts by weight of a surfactant per 100 parts by weight of the organopolysiloxane, wherein the surfactant is selected from the group consisting of alkyl sulfates, sulfonates, alkyl polyglycol ethers, alkylaryl polyglycol ethers and ethylene oxide/propylene oxide block copolymers,
   (C) water, and optionally
   (D) fillers, fungicides, bactericides, algicides and corrosion inhibitors, where the total of components (A), (B) and (D) is from 0.01% to 2% by weight of the emulsion,
   is introduced into the crude-oil containing deposits, thereby displacing crude oil and subsequently extracting the displaced crude oil through a production well.

2. A process as claimed in claim 1, wherein the organopolysiloxane is made up of at least 80% by weight of an organopolysiloxane comprising at least 90 mole % of units of formula (II) and at least 50 mole % of the remaining units of the formulae (I) and (V).

3. A process as claimed in claim 2, wherein the organopolysiloxane has a viscosity of from 50 to 500,000 mPa·s at 25° C.

4. A process as claimed in claim 1, wherein the total of components (A), (B) and (D) is from 0.05% to 1% by weight of the emulsion.

5. The process as claimed in claim 1, wherein 30 to 80 parts by weight of surfactant (B) are present per 100 parts by weight of organopolysiloxane (A).

* * * * *